United States Patent
Burger et al.

(10) Patent No.: US 6,965,969 B2
(45) Date of Patent: Nov. 15, 2005

(54) NON-UNIFORM CACHE APPARATUS, SYSTEMS, AND METHODS

(75) Inventors: Doug Burger, Austin, TX (US); Stephen W. Keckler, Austin, TX (US); Changkyu Kim, Austin, TX (US)

(73) Assignee: Board of Regents, The University of Texas Systems, Austin, TX (US)

(*) Notice: Subject to any disclaimer, the term of this patent is extended or adjusted under 35 U.S.C. 154(b) by 0 days.

(21) Appl. No.: 10/962,295

(22) Filed: Oct. 8, 2004

(65) Prior Publication Data

US 2005/0132140 A1 Jun. 16, 2005

Related U.S. Application Data

(63) Continuation of application No. PCT/US03/10621, filed on Apr. 8, 2003.
(60) Provisional application No. 60/370,680, filed on Apr. 8, 2002.

(51) Int. Cl.⁷ .............................................. G06F 12/00
(52) U.S. Cl. ...................... 711/128; 711/167; 711/136; 711/5
(58) Field of Search .................... 711/128, 167, 711/5, 136

(56) References Cited

U.S. PATENT DOCUMENTS 5,619,676 A * 4/1997 Fukuda et al. .............. 711/137
6,412,038 B1 * 6/2002 Mehalel ......................... 711/3
6,549,987 B1 * 4/2003 Rappoport et al. ......... 711/128

OTHER PUBLICATIONS

Kim, Changkyu et al. "An Adaptive Non–Uniform Cache Structure for Wire–Delay Dominated On–Chip Caches", Proceedings of the 10th International Conference on Architectural Support for Programming Languages and Operating Systems; Oct. 2002.*

* cited by examiner

Primary Examiner—Reginald G. Bragdon
(74) Attorney, Agent, or Firm—Schwegman, Lundberg, Woessner & Kluth, P.A.

(57) ABSTRACT

An apparatus or system may comprises cache control circuitry coupled to a processor, and a plurality of independently accessible memory banks (228) coupled to the cache control circuitry. Some of the banks may have non-uniform latencies, organized into two or more spread bank sets (246). A method may include accessing data in the banks, wherein selected banks are closer to the cache control circuitry and/or processor than others, and migrating a first datum (445) to a closer bank from a further bank upon determining that the first datum is accessed more frequently than a second datum, which may be migrated to the further bank (451).

53 Claims, 6 Drawing Sheets

NON-UNIFORM CACHE APPARATUS, SYSTEMS, AND METHODS

CROSS-REFERENCE TO RELATED APPLICATION

This application is a continuation under 35 U.S.C. 111(a) of PCT/US03/10621, filed on Apr. 8, 2003 and published on Oct. 23, 2003 as WO 03/088048 A1, which claims priority under 35 U.S.C 119(e) of U.S. Provisional Application No. 60/370,680, filed on Apr. 8, 2002, which applications and publication are incorporated herein by reference.

TECHNICAL FIELD

Embodiments of the invention relate generally to apparatus, systems, and methods for implementing a cache memory in a computer system. More specifically, embodiments of the invention relate to apparatus, systems, and methods utilizing cache memories having a plurality of accessible banks.

BACKGROUND

Caches used to access main memory in a computer system can be organized into discrete, hierarchical levels. Typically, each level obeys inclusion, replicating the contents of a smaller level above it, so as to reduce the number of accesses to lower levels of the hierarchy. As memory access bandwidth demands grow, and technology feature size is further reduced, the size of on-chip cache memories is expected to increase.

Single levels of cache have traditionally had uniform access times. This Uniform Cache Architecture (UCA) may be divided into multiple sub-banks to reduce access time. A central pre-decoder is often used to drive signals to local decoders in the sub-banks. Data can be accessed at each sub-bank and returned to the output drivers after passing through multiplexers, where the requested line is assembled and driven to the cache controller. Increasing the size of the cache may increase data access time, due in part to global wire delays across the cache. Such delays may then contribute to the bulk of data access time, due to routing time to and from the banks. Thus, even when an optimal sub-banking organization is used, large caches of this type may perform poorly because the wire-delay-dominated process holds up receiving a portion of a line from the slowest of the sub-banks.

Another problem which may arise is that of contention, including bank contention, which occurs when a request stalls because the needed bank is busy servicing a different request, and channel contention, which occurs when the bank is free but the routing path to the bank is busy. In a UCA cache, latencies due to port contention may be sufficiently high to cause substantial losses. Multiported cells can be a poor solution for overlapping accesses in large caches, since area increases may expand loaded access times significantly. This is why, in some cases, a dual-port cache may not perform as well as a single-ported solution.

Thus, there is a need for apparatus, systems, articles, and methods for more efficiently utilizing cache memory banks that are independently accessible. There is also a need for apparatus, systems, articles, and methods which operate to reduce contention in the cache environment.

SUMMARY

An apparatus or system may comprise cache control circuitry and a plurality of independently accessible memory banks coupled to the cache control circuitry. Some of the banks may have non-uniform latencies, organized into two or more spread bank sets. A method may include accessing data in the banks, wherein selected banks are closer to the cache controller and/or a processor than others, and migrating a first datum to a closer bank from a further bank upon determining that the first datum is accessed more frequently than a second datum, which may be migrated to the further bank.

DETAILED DESCRIPTION

In the following detailed description of various embodiments of the invention, reference is made to the accompanying drawings that form a part hereof, and in which are shown by way of illustration, and not of limitation, specific embodiments in which the subject matter may be practiced. In the drawings, like numerals describe substantially similar components throughout the several views. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments of the invention is defined only by the appended claims, along with the full range of equivalents to which such claims are entitled.

Performance can be lost due to worst-case uniform access in a wire-delay dominated cache. However, multiple banks can mitigate the loss when the data to be accessed are located in a particular manner, for example, and various banks are accessed at non-uniform (i.e., different) speeds, perhaps proportional to the distance of each bank from the cache controller and/or processor. In some embodiments, each bank is independently addressable, and sized and/or partitioned into a locally optimal physical sub-bank organization. The number and physical organization of banks and sub-banks can be chosen to maximize the overall performance, after a systematic exploration of the design space. Data may be statically mapped into banks, with a subset of the address bits used to determine the bank. For example, the low-order bits of the address may be used as a mapping index. The banks may be n-way, set-associative, for example: four-way, set associative, with total associativity being the product of inter-bank and intra-bank associativity, as explained below. Such static, non-uniform cache architectures may present several advantages. For example, accesses to banks closer to the cache controller and/or processor may incur lower latency. If the closer banks are accessed more often, performance can increase quite dramatically.

For example, each addressable bank in a static NUCA organization may have two (or more) private, per-bank 128-bit data communication channels, one going in each direction. Since banks have private channels, each bank can be accessed independently at high speed. While smaller banks may provide more concurrency and a smaller difference in latency between adjacent banks, numerous per-bank channels add area, and thus time, penalties.

The average performance for NUCA may increase as the cache size increases, up to some point. At even greater sizes, the large area taken by the cache may cause the increased hit latencies to overwhelm the benefits of a reduced number of misses.

As technology feature size diminishes, both the access time of individual banks and the routing delay to banks located further from the cache controller increase because the best organization for smaller technologies may use larger banks. The overhead of larger, slower banks may be less than the delays that would be caused by the extra wires required for more numerous, smaller banks. The greater wire delays encountered using small technologies may cause increased routing delays to the more distant banks. While raw routing delays in the cache can be significant, contention may be less of a problem.

As the number of banks increases an optimal number may be reached, due to the area overhead of the per-bank channels, such that each bank grows larger and slower as the cache size increases. This basic static NUCA constraint may thus prevent exploiting the reduced access time on small, fast banks.

Figure 1A:
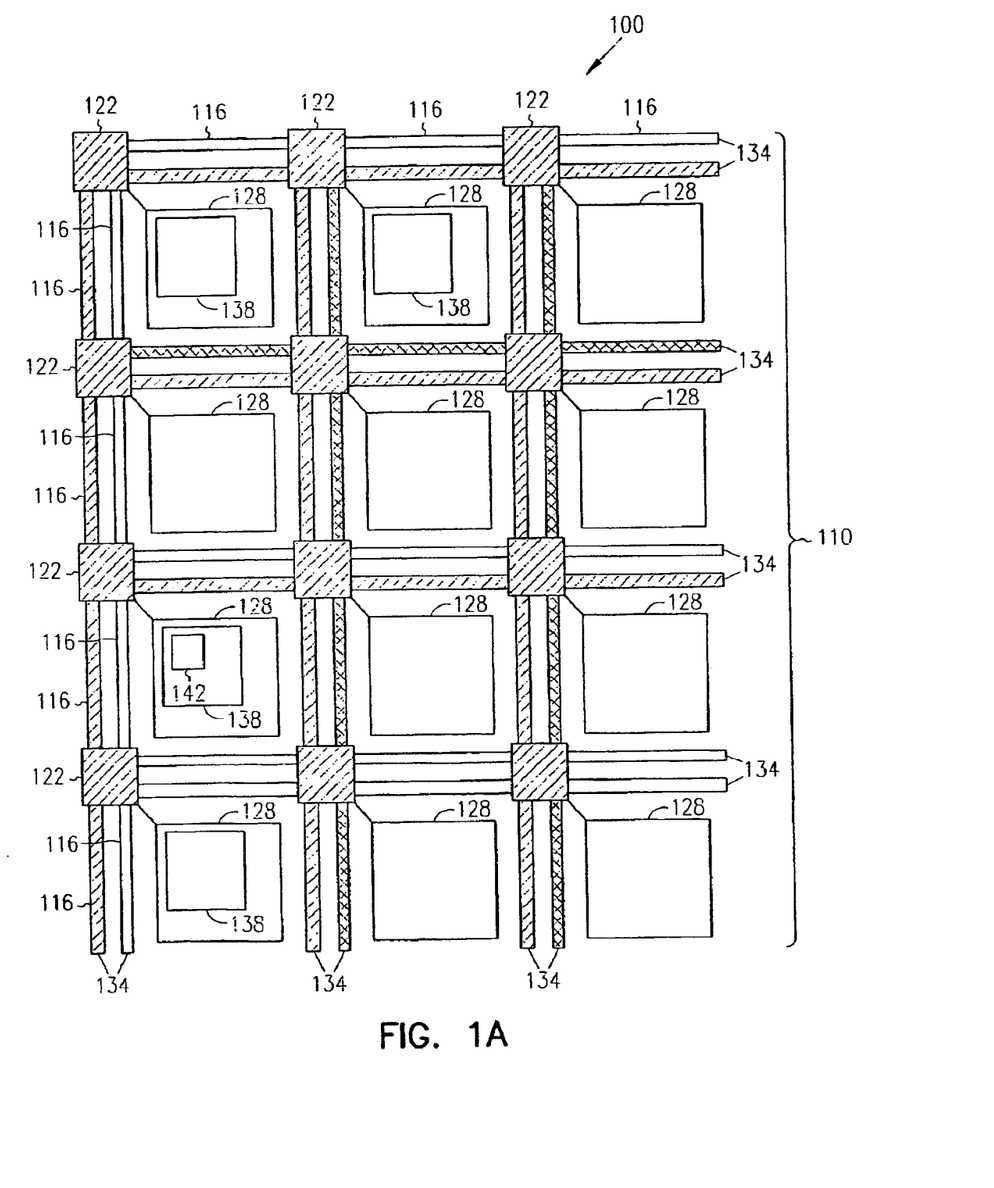
FIGS. 1A and 1B are block diagrams of a static non-uniform cache architecture according to various embodiments of the invention.
Figure 1B:
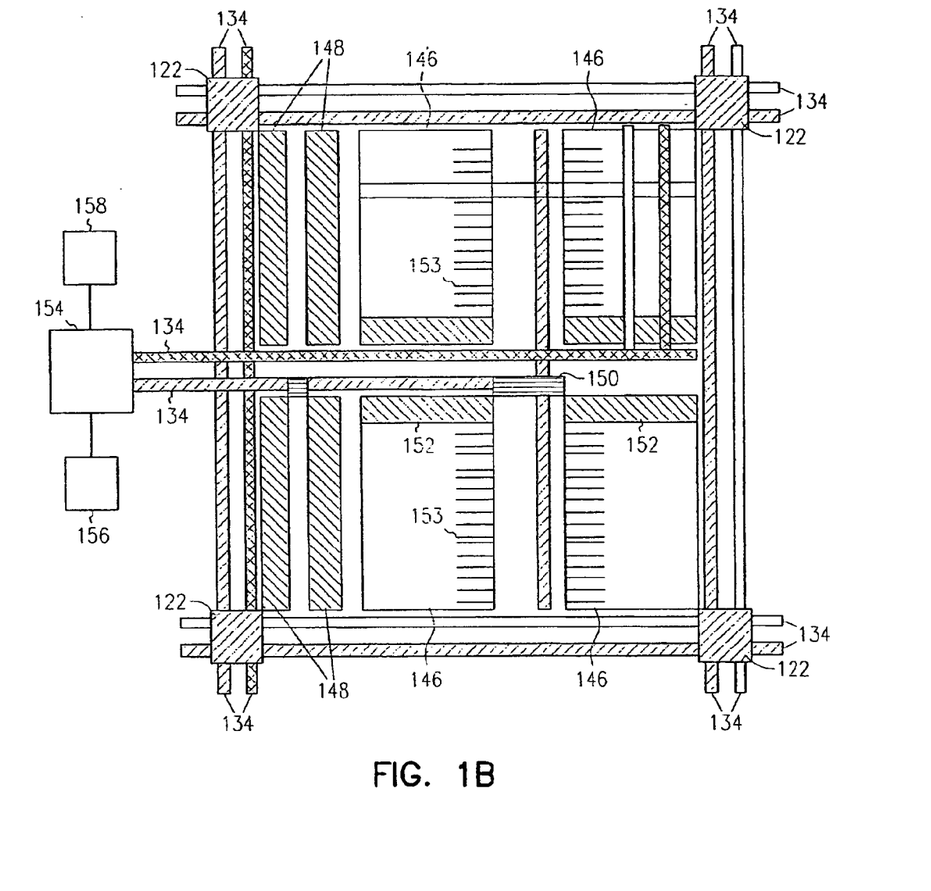

To mitigate the per-bank channel area constraint which can be imposed by the basic NUCA architecture, another structure can be used. FIGS. 1A and 1B are block diagrams of a static non-uniform cache architecture according to various embodiments of the invention.

In this case, the organization of the apparatus 100 may obviate the need for many of the wires resulting from per-bank channels. This organization, called Switched-NUCA, embeds a network 110, such as a lightweight, wormhole-routed two-dimensional mesh, for example, with point-to-point links 116 to simple switches 122 at each bank 128. Each link 116 may have, for example, two separate 128-bit channels 134 for bidirectional routing, and four-way set-associative banks 128. Each switch 122 can be set up, for example, to buffer 16-byte packets, and each bank 128 may contain a larger buffer 138 to hold an entire pending request 142. Thus, one request 142 can be queued at a specific bank 128 while another is being serviced. The arrival of a third request would block the network links 116, buffering the newly-arrived request 142 in the network switches 122 and delaying other requests which may need to use those switches 122. Other banks 128 along different network 110 paths may be accessed in parallel. Referring now to FIG. 1B, it can be seen that each bank 128 may also include a plurality of sub-banks 146, one or more tag arrays 148, a predecoder 150, sense amplifiers 152, and wordline drivers and decoders 153. The banks may be coupled to cache controller circuitry 154 via channels 134.

Each bank 128 can be sized so that the routing delay along one bank 128 is just under one clock cycle. Switches 122 may be set up to include buffer 138 slots for any number of bits per channel, including four bits per channel. Experimentation has shown that using the switched NUCA organization may provide minimum, average, and maximum bank latencies that are significantly smaller for the static NUCA organization. The switched NUCA network 110 can speed up cache accesses because it consumes less area than the private, per-bank channels, resulting in a smaller array and faster access to all banks 128. For example, in some embodiments, in the basic static NUCA organization, wires may consume 21% of the bank area, whereas in the static NUCA organization, channel overhead may be limited to less than 6% the total area of the banks 128.

Thus, experimentation has shown that the switched NUCA organization may provide significantly faster access than the basic static NUCA organization, especially as technology feature size decreases. An additional benefit which may be derived from a reduced per-bank wire overhead is that larger numbers of banks 128 may be implemented on-chip.

Selecting policy alternatives for mapping, searching, and movement of data can further improve performance. For these policies, three areas of data management within the cache can be considered: (1) logical-to-physical mapping: how the data are mapped to the banks, and in which banks a datum can reside, (2) searching: how the set of possible locations are searched to a line, and (3) movement: under what conditions the data should be migrated from one bank to another. For example, non-uniform access can be exploited by placing frequently accessed data in faster banks (e.g., closer to the cache controller) and less important, yet still cached data, in slower banks (e.g., farther from the cache controller).

A large number of banks provides substantial flexibility for mapping cache lines to banks. At one extreme are basic static NUCA strategies, in which a line of data can only be mapped to a single statically determined bank. At the other extreme, a line could be mapped into any cache bank. While the latter approach increases placement flexibility, the overhead of locating the line may be too large as each bank must be searched, either through a centralized tag store or by broadcasting the tags to all of the banks. An intermediate solution may be implemented, using spread bank sets.

For the purpose of this disclosure, the following definitions may be observed, noting that a search of M banks in a cache may be accomplished with k steps, where some subset of the M banks is searched with each step (i.e., $s_1$, $s_2$, . . . , $s_k$), such that the sum of the banks in the subsets searched equals M.

Mapping

Spread Bank Set: is a cache memory bank organization wherein the ways of each set are allocated among multiple physical banks, or "spread" across multiple banks, instead having all of the set associative ways reside in a single bank.

Dynamically Mapped: refers to a cache line which can be mapped to two or more of the M banks, and which can be moved among the possible banks while resident in the cache.

Fair Mapping: is a strategy which involves mapping selected ways from each bank set into different banks such that each bank set has a substantially equal average access time.

Fast Shared Mapping: is a strategy wherein selected banks closest to the processor/controller (e.g., the faster banks) are shared among multiple bank sets, each set of which in turn may include other banks which are not shared among the multiple bank sets.

Copy Policies

One Copy Policy: is a cache eviction policy wherein the victim cache line can be moved elsewhere in the cache (e.g., to a target line location, typically further from the cache controller than the original location of the victim cache line, prior to movement), and then the target line can be evicted from the cache.

n-Copy Policy: is a variation of the One Copy Policy, wherein a first victim cache line can be moved elsewhere in the cache (e.g., to a first target line location), and then the first target line is moved elsewhere in the cache (e.g., to a second target location), and then the second target line is moved elsewhere, and so forth, until n-lines have been moved.

Zero Copy Policy: is a cache eviction policy wherein the victim cache line is not moved at all, but simply evicted from the cache.

Search Policies

Incremental Search Policy: can be implemented by searching individual banks in a cache in succession, such as in a substantially serial fashion (i.e., k=M, and for $1 \leq i \leq k$, $s_i=1$).

Limited Multicast Search Policies: can be implemented by searching for desired data in some selected number of banks or subset of banks in a cache in a substantially simultaneous fashion (e.g., the search request is sent or broadcast to the selected subset of banks at substantially the same time). The subset of banks may be selected by choosing a number of banks that are closest to the controller and/or processor, or by using those banks identified by a partial-tag store. The controller may comprise a processor, or be coupled to a processor.

Multicast Search Policy: can be implemented by searching substantially all of the banks in a cache in a substantially simultaneous fashion (e.g. a search request is sent to substantially all of the banks at substantially the same time, or k=1).

Partitioned Multicast Search Policy: can be implemented by searching for desired data in some selected number of banks or subset of banks in a cache in a substantially simultaneous fashion (e.g. the search request is sent to a selected subset of banks at substantially the same time, such as setting k=2, and $s_1=M/2$, $s_2=M/2$). The subset of banks may be selected by choosing some number of banks which are closest to the cache controller. Then, if the desired data are not located within the selected subset of banks, the remainder of the cache banks can be searched in an incremental fashion.

Figure 2:
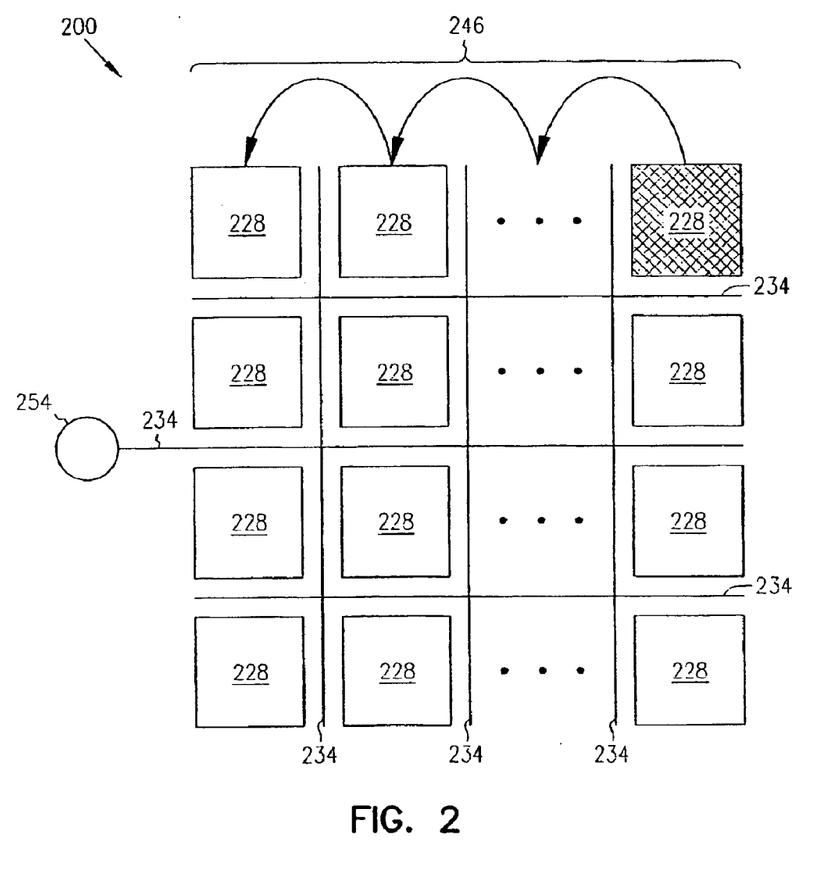
FIG. 2 is a block diagram of a dynamic non-uniform cache architecture according to various embodiments of the invention.

FIG. 2 is a block diagram of a dynamic non-uniform cache architecture according to various embodiments of the invention. Spread bank sets involve treating a multi-bank cache 200 as a set-associative structure, wherein each set 246 is spread across multiple banks 228, and each bank 228 holds one or more ways of the set 246. The collection of banks 228 used to implement this associativity may then be called a bank set 246, and the number of banks in the set corresponds to the associativity. The different associative ways may have different access latencies.

Figure 3A:
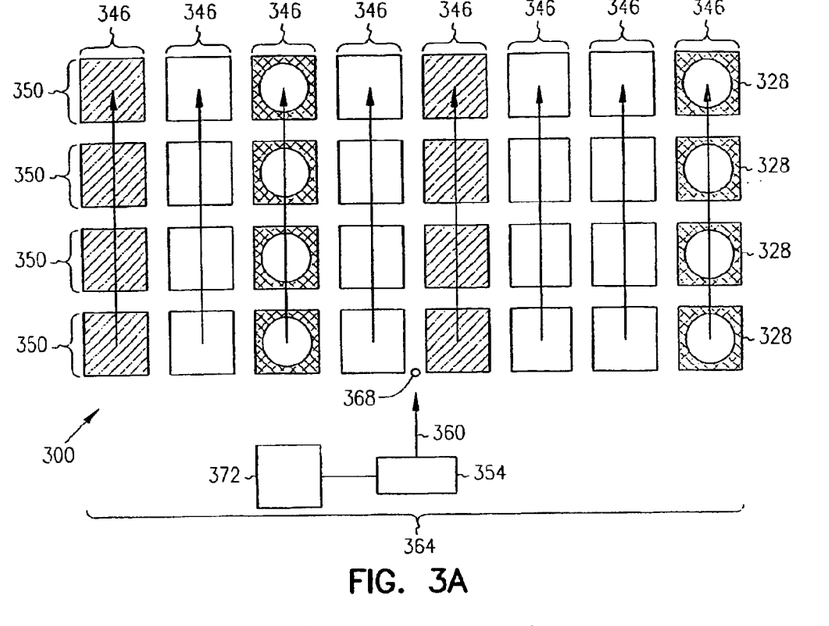
FIGS. 3A, 3B, and 3C are flow diagrams illustrating data mapping schemes according to various embodiments of the invention.

FIGS. 3A, 3B, and 3C are flow diagrams illustrating data mapping schemes according to various embodiments of the invention. A cache may comprise multiple bank sets. For example, as shown in FIG. 3A, a cache 300 with 32 banks may be organized as a four-way set-associative cache, with eight bank sets 346, each including four cache banks 328. To check for a hit in a spread set cache 300, the pertinent tag in each of the four banks 328 of the bank set can be checked.

Any number of methods can be used to allocate banks 328 to bank sets 346 and ways, including simple mapping, fair mapping, and shared mapping. Using an embodiment of a simple mapping policy, shown in FIG. 3A, each column of banks 328 in the cache 300 may become a bank set 346, and all banks 328 within that column may comprise the set-associative ways 350. Thus, the cache 300 may be searched for a line by first selecting the bank set column, selecting the way 346 within the column, and finally performing a tag match on banks 328 within that column of the cache. Thus, a column may represent a number of bank sets, and a bank within a column can hold one way (or more if there is intra-bank associativity) for each of the banks sets in that column. It should be noted that the number of rows may not correspond to the number of desired ways 350 in each bank set 346, and that latencies to access all bank sets 346 are not the same; thus, some bank sets 346 will be faster than others, since some rows 350 are closer to the cache controller 354 than others.

Figure 3B:
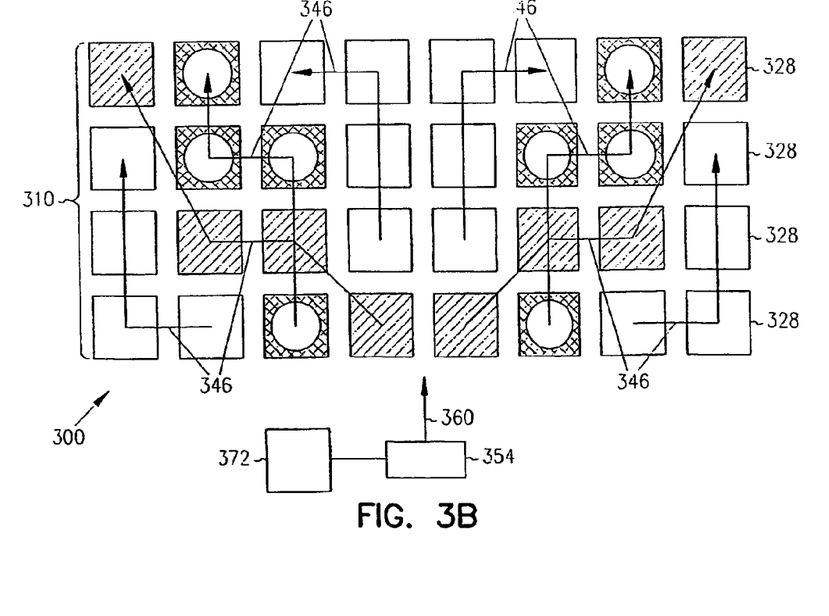

FIG. 3B shows an embodiment of a fair mapping policy, which addresses problems that can arise under the simple mapping policy at the cost of additional complexity. In this case, the mapping of sets 346 to physical banks 328 is indicated with the arrows 346 in the diagram. Banks 328 are allocated to bank sets 346 so that the average access time across all bank sets 346 are substantially equal. The fair mapping policy may provide an approximately equal average access time for each bank set 346. However, a more complex routing path from bank 328 to bank 328 within a set 346 may be required, causing potentially longer routing latencies and more contention within the network 310.

Figure 3C:
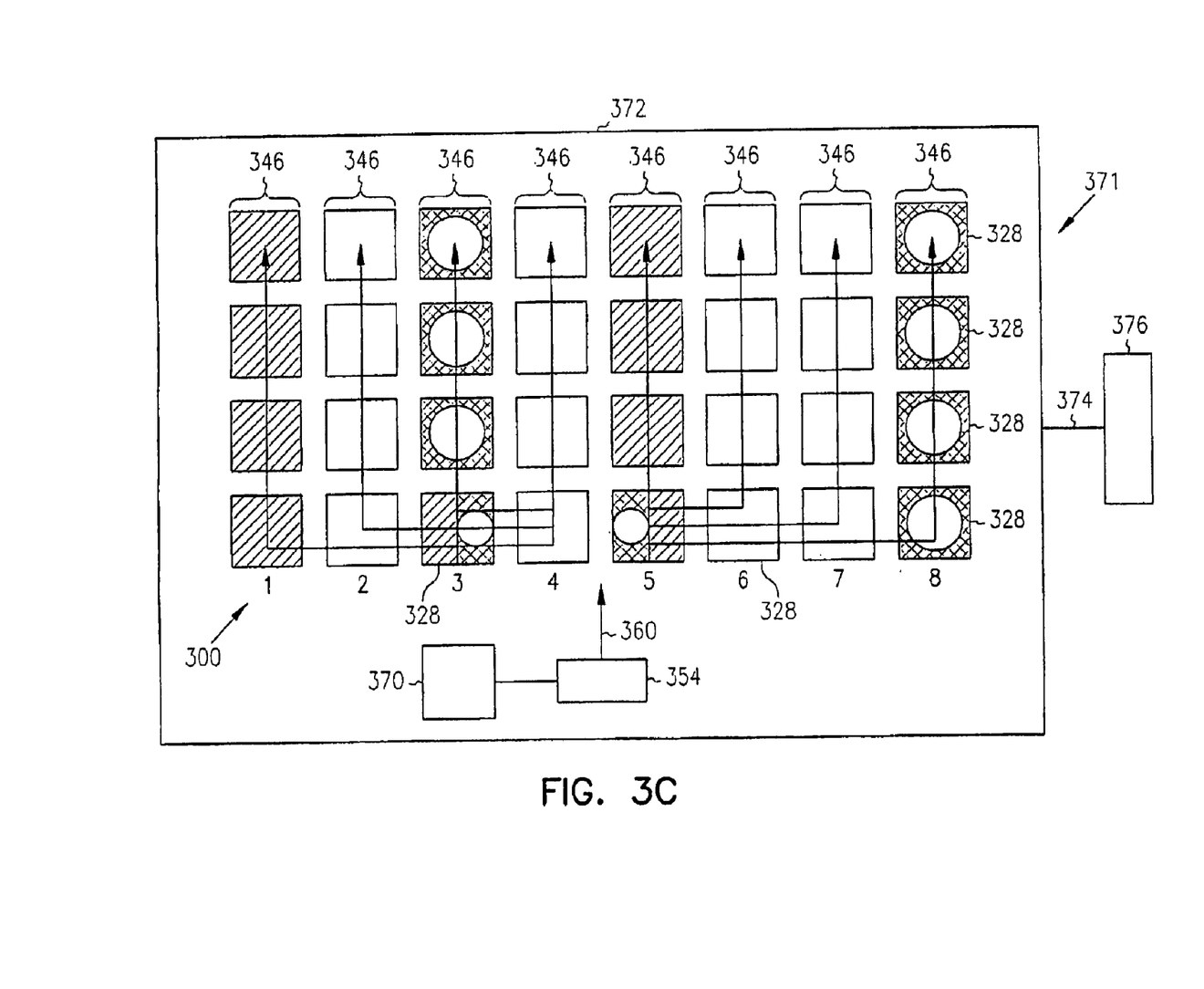

An embodiment of the shared mapping policy, involving fast shared mapping, is shown in FIG. 3C. This strategy attempts to provide fastest-bank access to all bank sets by sharing the closest banks to the cache controller among multiple bank sets. Intra-bank associativity is the traditional manner of viewing set associativity. Inter-bank associativity is implemented with spread bank sets, as described herein. Total associativity is the arithmetic product of inter-bank and intra-bank associativity. Thus, if spread bank sets share a single bank, then all banks in the cache are N-way set associative. Otherwise, a swap from a solely owned bank into a shared bank could result in a line that cannot be placed into the solely owned bank, since the shared bank has fewer sets than the nonshared bank. In some embodiments, it may be best to allow a maximum of two bank sets to share a bank. Thus, each of the N/M (e.g., M=2) farthest bank sets may share half of the closest bank for one of the closest N/M bank sets. This choice results in some bank sets having a slightly higher bank associativity than the others (because some of the bank sets may have more unshared banks), which can offset the slightly increased average access latency to that bank set. Such a strategy is illustrated by example in FIG. 3C, by which the bottom bank 328 of column 3 caches lines from columns 1 and 3, the bottom bank 328 of column 4 caches lines from columns 2 and 4, and so on. In this example, the farthest four (columns 1, 2, 7, and 8) of the eight bank sets 346 share the closest banks 328 of the closest four (columns 3, 4, 5, and 6) of the eight bank sets 346.

Searching for and locating a line included in a bank set can be accomplished by using several different policies, since performance is lost when the time to determine a hit or miss increases. One possible policy is that of the incremental search, in which banks are searched in order starting from the closest bank to the cache controller, and proceeding until the furthest bank from the cache controller, until the requested line is found or a miss occurs in the last bank.

Another possible policy is that of the multicast search, in which the requested address is broadcast in a substantially simultaneous manner to some or all of the banks in the requested bank set. Look-ups proceed roughly in parallel, but at different actual times due to routing delays through the network. The multicast search policy offers good performance at the cost of increased energy consumption and network contention, since hits to banks far from the controller may be serviced faster than in the incremental search policy. However, the extra address bandwidth consumed as the address is routed to each bank may slow other accesses.

Hybrid intermediate policies are also possible, such as the limited multicast policy, in which the first portion of the banks in a bank set are searched in parallel, followed by an incremental search of the remaining portion. Most of the hits will thus be serviced by a fast lookup, but the energy and network bandwidth consumed by accessing all of the ways at once may be avoided. Another hybrid policy is that of the partitioned multicast, in which a bank set is broken down into subsets of banks. Each subset is searched iteratively, but the member banks included in each subset are searched in parallel.

A distributed cache array, in which the tags are distributed with the banks, may also benefit from advanced search techniques. First, many banks may need to be searched to find a line on a cache hit. Second, if the line is not in the cache, the slowest bank dictates the time necessary to determine that the request results in a miss. That is, the miss resolution time grows as the number of banks in the bank set increases. While an incremental search policy can reduce the number of bank look-ups, the serialized tag lookup time increases both the hit latency and the miss resolution time.

Implementing a partial tag comparison may operate to reduce both the number of bank look-ups and the miss resolution time. In this case, partial tag bits can be stored in a smart search array located in the cache controller. For example, two "smart search" policies, based on the partial tag comparison, may be implemented. Using a first policy, the cache array can be searched as in previous policies. However, in a substantially parallel manner, the stored partial tag bits are compared with the corresponding bits of the requested tag, and if no matches occur, miss processing is commenced immediately. For this policy, the smart search array should contain enough of the tag bits per line to make the possibility of false hits low, so that upon a miss, accidental partial matches of cached tags to the requested tag are infrequent. In some embodiments, experimentation shows that using about three to about six bits from each tag strikes a good balance between reducing the probability of incurring a false hit and increasing the access latency to the smart search array.

Using a second smart search policy, a partial tag comparison can be used to reduce the number of banks that are searched upon a miss. Since the smart search array takes multiple cycles (e.g., four to six cycles) to access, serializing the smart search array access before any cache access may significantly reduce performance. As an alternative, access to the closest bank (or one or more closer banks) may be permitted to proceed in parallel with the smart search array access. If a hit in the closest bank to the cache controller does not occur during this first access, all other banks for which the partial tag comparison was successful are searched in parallel.

Dynamic-NUCA (D-NUCA) apparatus, systems, and methods may operate to increase the number of cache hits in those banks which are closest to the cache controller by permitting the banks to which cache lines are assigned to change. The Least-Recently-Used (LRU) bits may be used to dictate the location of lines. Unfortunately, this may result in a large amount of traffic and data movement between banks. Generational promotion, which may include moving a cache line in increments and/or promoting data of substantially similar age at substantially the same time, can be used to reduce the amount of copying required by pure forms of LRU data mapping, while still approximating an LRU list mapped onto the physical topology of a bank set. Thus, when a hit occurs to a cache line, the line can be swapped with the line in the bank that is the next closest to the cache controller. Heavily used lines may then migrate toward faster banks (i.e., those located closer to the cache controller), whereas less frequently used lines can be demoted to slower banks (i.e., those located further from the cache controller).

D-NUCA apparatus, systems, and methods may also operate to determine the placement of an incoming block of data resulting from a cache miss. For example, if a replacement block of data is loaded into a bank close to the cache controller, an important block of data may be displaced from that location. However, if the replacement is itself a highly-used block of data, and is loaded into a bank further from the cache controller, the replacement block may require several accesses before it eventually migrates to faster, closer banks. Promotion can be described in terms of promotion distance, measured in terms of cache banks (e.g., a promotion distance of three banks can mean promoting a cache line from bank 5 to bank 2 along a line of 8 banks from the slowest, farthest bank to the fastest, closest bank). Promotion call also be described in terms of a promotion trigger, measured in terms of the number of hits to a bank which may occur prior to implementing a promotion of the data block. "Tail insertion" may also be implemented. For example, when a miss occurs, the fetched cache line can be placed into the farthest bank from the cache controller, or the "tail" of the spread set.

Another decision to be made involves what is done with a victim block of data upon a replacement. Many types of eviction policies exist, including those in which the victim is evicted from the cache (a zero-copy policy), and those in which the victim is moved to a lower-priority bank, replacing a less important line farther from the cache controller (a one-copy policy). Thus, the location in which to place an incoming data block is selected, and the displaced data block may or may not be copied.

Many combinations of the policies described to this point are possible, resulting in myriad embodiments of the invention. For example, one embodiment may include simple mapping, multicast search, one-bank promotion on each hit, and a replacement policy that chooses the block in the slowest bank as the victim upon a miss. These techniques operate with various cache sizes, including D-NUCA caches having many megabytes of memory (e.g., 1 MB, 2 MB, 4 MB, 8 MB, 16 Mb, etc.) with bank sets having any number of associative ways (e.g., two-way, four-way, eight-way, 16-way, etc.). Thus, for example, another D-NUCA embodiment may include simple mapping, multicast search, tail insertion, and single-bank promotion upon each hit.

Other embodiments may be derived from adjusting individual policies in an independent fashion. For example, the mapping function may be changed from simple to fair, which may reduce performance due to contention in the switched network, even though unloaded latencies are lower. It should be noted that other types of networks may be used instead of a switched network. Another example includes changing from a multicast to a purely incremental search policy, which may substantially reduce the number of bank accesses.

Many hybrid search policies can be constructed by mixing aspects of multicast and incremental search policies. For example, a hybrid policy might include multicasting to the first two banks in a bank set, and then incrementally searching the remaining banks. A different hybrid policy may include multicasting to the first two banks, and if the data were not found, multicasting to the remaining banks might occur. Judicious selection of the hybrid policy can improve performance and decrease the number of bank accesses which may be required by baseline, non-hybrid policies.

The data promotion policy may permit blocks to be promoted only after multiple hits, or may operate such that blocks are promoted multiple banks upon a single hit. The eviction policy may permit replacing the block at the tail of the list for eviction, or alternatively, replacing the block at the head of the eviction list, and copying it into a random, lower-priority bank set. Another embodiment may combine a smart search policy with shared mapping.

In other embodiments of the invention, the apparatus may include cache control circuitry and a plurality of independently accessible memory banks coupled to the cache control circuitry, wherein at least two of the plurality of independently accessible memory banks have non-uniform latencies. Each one of the plurality of independently accessible memory banks may be coupled to the cache control circuitry using a switched network. Selected ones of the plurality of independently accessible memory banks may include a word line driver and a decoder. Selected ones of the plurality of independently accessible memory banks may include a sense amplifier.

Thus, referring now to FIGS. 1–3, it can be seen that a variety of embodiments have been described. For example, in an embodiment, an apparatus 300 may include cache control circuitry 354 and a plurality of independently accessible memory banks 328 coupled to the cache control circuitry 354, wherein at least two of the plurality of independently accessible memory banks 328 have non-uniform latencies. A plurality of cache lines can be statically mapped to at least one of the plurality of independently accessible memory banks 328. And, if desired, each one of the plurality of independently accessible memory banks 328 can be coupled to the cache control circuitry 354 using a network 360, which may include one or more private channels.

As noted above, the non-uniform latency times may be caused by or include a wire delay to route data to the plurality of independently accessible memory banks 328. Non-uniform latencies may also be caused by or include the bank access time for the plurality of independently accessible memory banks 328. Still further, non-uniform latencies can be caused by or include the access time for the network 360, or private channel(s) coupled to a selected one of the plurality of independently accessible memory banks 328. Thus, it may be that the cache control circuitry 354 is unable to send a second request to one of the plurality of independently accessible memory banks until the selected bank has completed processing a first request from the cache control circuitry 354.

The apparatus 300 may have the banks 328 organized such that the banks 328 are formed as an array having a side 364 including a middle 368, wherein the cache control circuitry 354 is located approximately at the middle 368 of the side 364. Selected ones of the plurality of independently accessible memory banks 328 can be set-associative banks (e.g., n-way or four-way set associative banks).

In some embodiments, each one of the plurality of independently accessible memory banks 128 can be coupled to the cache control circuitry 154 using a switched network 110. The network 110 may be a switched two-dimensional mesh network 110, and may include a plurality of point-to-point links 116. Selected ones of the plurality of point-to-point links 116 can be connected using unidirectional or bidirectional routing.

The switched network 110 may include a plurality of routers 122. Selected ones of the plurality of routers 122 can be located at selected intersections of the plurality of independently accessible memory banks 128. The routers 122 can be used to route addresses and/or data, including read data and write data. The switched network 110 may be a synchronous network, or an asynchronous network.

Some of the banks 128 may include a request buffer 138 and/or a tag array 148. The request buffer 138 may be coupled to the cache controller circuitry 154, wherein a request from the cache controller circuitry 154 to one of the plurality of independently accessible memory banks 128 results in a conflict, such that the request is stored in the request buffer 138.

It can also be seen that a plurality of cache lines are capable of being dynamically mapped to at least two of the plurality of independently accessible memory banks 128. A tag store 156 may be coupled to the cache controller circuitry 154.

Several approaches to storing tags are possible. For example, the tag store 156 may be centralized and located outside of the cache banks 128. Alternatively, tags may also be distributed and stored in each bank 128. A hybrid approach may involve distribution of full tags to the banks 128, and storage of partial tags in a centralized tag store 156. In this case, the partial tags can be used to indicate approximate locations where searches for the full tags should be conducted. In addition, a broadcast module 158 may be coupled to the cache controller circuitry 154 for broadcasting a tag to each one of the plurality of independently accessible memory banks 128.

In addition, the plurality of independently accessible memory banks 328 can be organized into at least two spread bank sets 346. A selected bank 328 of the plurality of independently accessible memory banks 328 may be located closer to a processor 372 and/or cache controller circuitry 354 to which the processor 372 is coupled, than another selected bank 328 of the plurality of independently accessible memory banks 328. The selected bank 328 (i.e. the closer bank) and the other selected bank 328 (i.e., the farther bank) can be located in a selected one (i.e., the same bank set) of the at least two spread bank sets 346 (see FIG. 2B). Each bank 328 in one of the at least two spread bank sets 346 may hold at least one associative way of the one of the at least two spread bank sets 346. In addition, the one of the at least two spread bank sets 346 may include at least two memory banks 328 wherein the at least one associative way of one of the at least two memory banks 328 has a different access latency than an other associative way of an other one of the at least two memory banks 328.

The plurality of independently accessible memory banks 328 may be organized into the at least two spread bank sets 346 by mapping a subset of the plurality of independently accessible banks 328 to each one of the at least two spread bank sets 346. The plurality of independently accessible memory banks 328 may be organized into the at least two spread bank sets 346 by single mapping a column of the plurality of independently accessible memory banks 328 to one of the at least two spread bank sets 346 and mapping another column of the plurality of independently accessible memory banks 328 to an other one of the at least two spread bank sets 346.

Thus, the plurality of independently accessible memory banks 328 may be organized into the at least two spread bank sets 346 by fair mapping selected ones of the plurality of independently accessible memory banks 328 according to an approximately equalized average access time. In addition, the plurality of independently accessible memory banks 328 may be organized into the at least two spread bank sets 346 by fast shared mapping selected ones of the plurality of independently accessible memory banks 328 according to a distance from the cache controller circuitry 354 associated with each one of the plurality of independently accessible memory banks 328. The plurality of independently accessible memory banks 328 may also be organized into an n-way set-associative cache memory 300 including m-spread bank sets 346, wherein each spread bank set 346 includes a subset of memory banks 328 selected from the plurality of independently accessible memory banks 328, and wherein at least two of the n-ways 350 has a different access latency (e.g., n may be four, m may be eight, and the subset of memory banks may include four memory banks). Each way 350 of the n-ways 350 may have a different access latency.

Embodiments of the invention may also include a processor 372, comprising one or more arithmetic functional units 370 (including, perhaps, an arithmetic logic unit), cache control circuitry 354 coupled to the arithmetic functional unit 370, and a plurality of independently accessible memory banks 328 coupled to the cache control circuitry 354. As noted previously, at least two of the plurality of independently accessible memory banks 328 may have non-uniform latencies, and the plurality of independently accessible memory banks 328 may be organized into at least two spread bank sets 346.

Other embodiments of the invention include a system 371 comprising a processor 372 including cache control circuitry 354 and a plurality of independently accessible memory banks 328 coupled to the cache control circuitry 354. A bus 374 may be operatively coupled to the processor 372, and a random access memory 376 may be operatively coupled to the bus 374. As noted previously, at least two of the plurality of independently accessible memory banks 328 may have non-uniform latencies, and may be mapped using many different methods, including being organized into one or more spread bank sets 346.

It is anticipated that apparatus, processors, memories, integrated circuits, cache controllers, systems, articles, methods, and other aspects of various embodiments of the invention may be adapted for use in applications other than for data transfer, and other than for systems that include computers, and thus, embodiments of the invention are not to be so limited. The illustrations of an apparatus 100, 200, 300 and a system 371 are intended to provide a general understanding of the structure of various embodiments of the invention, and they are not intended to serve as a complete description of all the elements and features of apparatus and systems that might make use of the structures described herein.

Applications which may include the novel apparatus and systems of various embodiments of the invention include electronic circuitry used in high-speed computers, communication and signal processing circuitry, data transceivers, modems, processor modules, embedded processors, and application-specific modules, including multilayer, multichip modules. Such apparatus and systems may further be included as sub-components within a variety of electronic systems, such as televisions, cellular telephones, personal computers, workstations, radios, video players, vehicles, and others.

Figure 4:
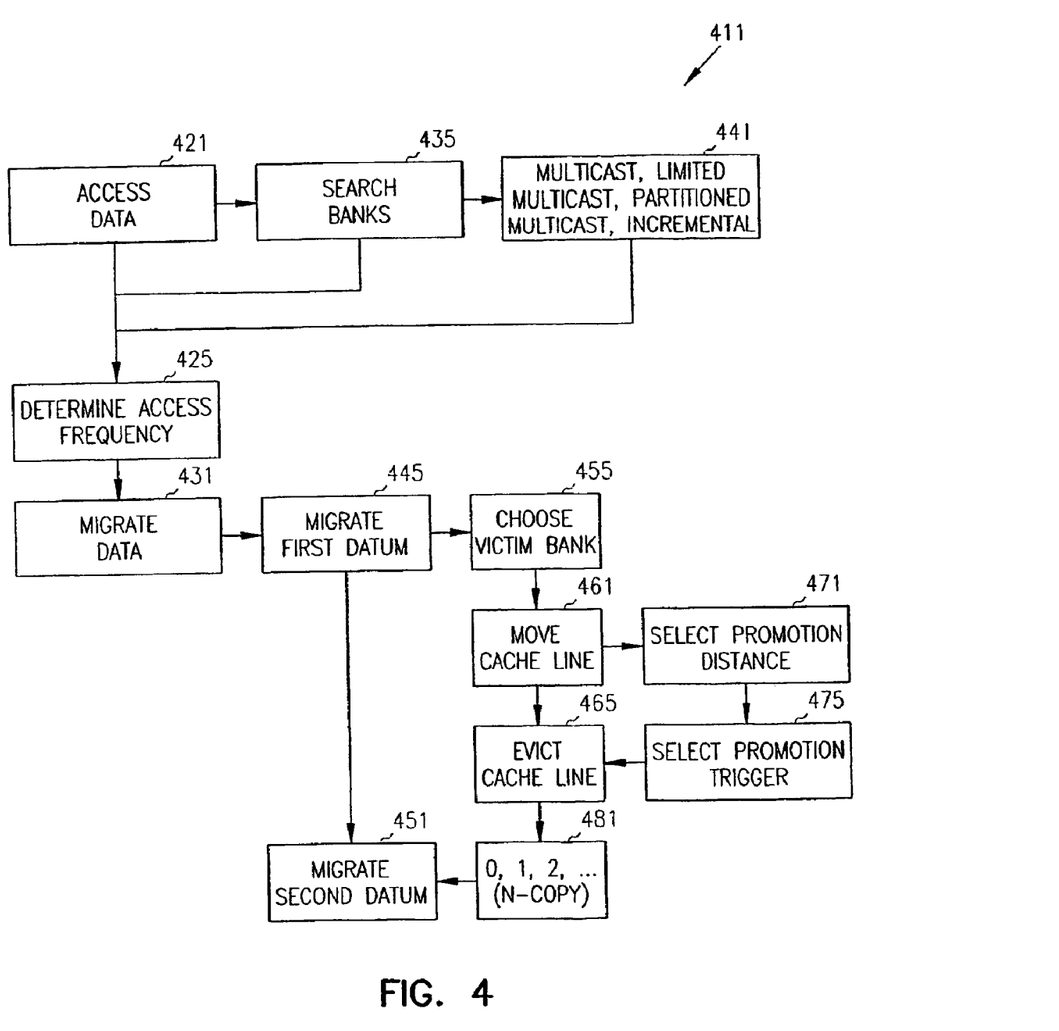
FIG. 4 is a flow chart diagram illustrating methods of accessing and moving data according to various embodiments of the invention.

Embodiments of the invention also include a number of methods. FIG. 4 is a flow chart diagram illustrating methods of accessing and moving data according to various embodiments of the invention. For example, the method 411 may begin with accessing data, including a first datum and a second datum, in a plurality of independently accessible memory banks operatively coupled to a processor at block 421. At least two of the plurality of independently accessible memory banks may have non-uniform latencies, and any number of the plurality of independently accessible memory banks may be organized into one or more spread bank sets. One or more of the plurality of independently accessible memory banks may be closer to the cache controller, which may be coupled to or which may comprise a processor, than selected other banks.

The method may include determining a frequency of access to data at block 425, and migrating the data to a selected bank from a selected other bank included in the plurality of banks at block 431. The selected bank may be located closer to the cache controller than the selected other one of the banks.

Accessing the first datum and the second datum at block 421 may include searching the plurality of independently accessible memory banks operatively coupled to a processor at block 435. Searching may be accomplished by using a multicast search policy at block 441. Accessing the first datum and the second datum at block 421 may also include searching the plurality of independently accessible memory banks using a limited multicast search policy at block 441. In addition, accessing the first datum and the second datum may include searching the plurality of independently accessible memory banks using an incremental search policy at block 441. Further, accessing the first datum and the second datum may include searching the plurality of independently accessible memory banks using a partitioned multicast search policy at block 441. Still further, accessing the first datum and the second datum may include searching the plurality of independently accessible memory banks using a combination of policies selected from the group which includes: a multicast policy, a limited multicast policy, an incremental search policy, and/or a partitioned multicast search policy at block 441.

The method 411 may include migrating the first datum to a selected one of the plurality of independently accessible memory banks from a selected other one of the plurality of independently accessible memory banks upon determining that a selected criterion has been met.

For example, the selected criterion may be met upon determining that the first datum is accessed more frequently than the second datum at block 445. Thus, on a migration path from the selected other one of the plurality of independently accessible memory banks to the selected one of the plurality of independently accessible memory banks, the first datum may be moved by migrating the first datum progressively closer to the cache controller through preselected ones of the plurality of independently accessible memory banks at block 445, perhaps by swapping the first datum with another datum located in a closer memory bank.

The method 411 may also include migrating the second datum to the selected other one of the plurality of independently accessible memory banks from the selected one of the plurality of independently accessible memory banks upon determining that a selected criterion has been met. For example, by determining that the first datum is accessed more frequently than the second datum at block 451. Again, the selected bank may be located closer to the cache controller than the selected other one of the banks. The plurality of independently accessible memory banks can be organized into an n-way set-associative cache memory including m-spread bank sets. Each spread bank set may include two or more memory banks selected from the plurality of independently accessible memory banks (e.g., n may be four, and in may be eight).

Migrating the first datum progressively closer to the cache controller through preselected ones of the plurality of independently accessible memory banks at block 445 may include choosing a victim bank within a selected one of the plurality of spread bank sets based on a least-recently-used (LRU) bit policy at block 455. Choosing the victim bank may also include the use of centralized tags, distributed tags, or hybrid strategies, as noted above. Thus, choosing a victim bank may include accessing a tag store to determine the bank(s) to access. Choosing a victim bank may also include accessing distributed tags, which may require searching individual banks to determine which bank to access. Finally, choosing a victim bank may include accessing partial tags in a tag store, and then accessing distributed tags in individual banks indicated by the partial tags.

Migrating the first datum progressively closer to the cache controller through preselected ones of the plurality of independently accessible memory banks at block 445 may also include moving a cache line within a selected one of the plurality of spread bank sets based on a generational promotion policy at block 461. The method 411 may continue with evicting a cache line at block 465.

Moving a cache line within a selected one of the plurality of spread bank sets based on a generational promotion policy at block 461 may include selecting a promotion distance for the generational promotion policy at block 471, and selecting a promotion trigger for the generational promotion policy at block 475. The method 411 may continue with evicting a cache line at block 465.

Thus, migrating the first datum progressively closer to the processor and/or cache controller through preselected ones of the plurality of independently accessible memory banks at block 445 may include evicting a cache line within a selected one of the plurality of spread bank sets at block 465, which may be based on a zero-copy policy or an n-copy policy (e.g., n=1, 2, 3, etc.) at block 481. The method may then continue with migrating the second datum at block 451.

Although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to those of skill in the art upon reviewing the above description.

The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:

1. An apparatus, comprising:
   cache control circuitry; and
   a plurality of independently accessible memory banks organized as spread bank sets and coupled to the cache control circuitry, wherein at least four of the plurality of independently accessible memory banks have non-uniform latencies.

2. The apparatus of claim 1, wherein a plurality of cache lines are statically mapped to at least one of the plurality of independently accessible memory banks.

3. The apparatus of claim 1, wherein each one of the plurality of independently accessible memory banks is coupled to the cache control circuitry using a private channel.

4. The apparatus of claim 1, wherein the cache control circuitry cannot send a second request to a selected one of the plurality of independently accessible memory banks until the selected one of the plurality of independently accessible memory banks has completed processing a first request from the cache control circuitry.

5. The apparatus of claim 1, wherein the plurality of independently accessible memory banks is formed as an array having a side, and wherein the cache control circuitry is located approximately at the side.

6. The apparatus of claim 1, wherein selected ones of the plurality of independently accessible memory banks are set-associative banks.

7. The apparatus of claim 1, wherein each one of the plurality of independently accessible memory banks is coupled to the cache control circuitry using a switched network.

8. The apparatus of claim 7, wherein the switched network is a switched two-dimensional mesh network.

9. The apparatus of claim 7, wherein selected ones of a plurality of point-to-point links included in the switched network are connected using bidirectional routing.

10. The apparatus of claim 7, wherein selected ones of a plurality of point-to-point links included in the switched network are connected using unidirectional routing.

11. The apparatus of claim 10, wherein the switched network includes a plurality of routers, and wherein selected ones of the plurality of routers are located at selected intersections of the plurality of independently accessible memory banks.

12. The apparatus of claim 11, wherein the plurality of routers is to route addresses.

13. The apparatus of claim 11, wherein the plurality of routers is to route read data.

14. The apparatus of claim 11, wherein the plurality of routers is to route write data.

15. The apparatus of claim 10, wherein selected ones of the plurality of independently accessible memory banks include a tag array.

16. The apparatus of claim 10, wherein selected ones of the plurality of independently accessible memory banks include a request buffer.

17. The apparatus of claim 10, further comprising:
   a request buffer coupled to the cache controller circuitry, wherein a request from the cache controller circuitry to one of the plurality of independently accessible memory banks results in a conflict, and wherein the request is stored in the request buffer.

18. The apparatus of claim 10, wherein the switched network is an asynchronous network.

19. The apparatus of claim 1, wherein a plurality of cache lines are capable of being dynamically mapped to at least two of the plurality of independently accessible memory banks.

20. The apparatus of claim 19, further comprising:
a distributed tag store coupled to the cache controller circuitry.

21. The apparatus of claim 19, further comprising:
a centralized partial tag store coupled to the cache controller circuitry.

22. The apparatus of claim 21, further comprising:
a broadcast module coupled to the cache controller circuitry for broadcasting a tag to each one of the plurality of independently accessible memory banks.

23. The apparatus of claim 1, wherein the plurality of independently accessible memory banks are organized into at least two spread bank sets.

24. The apparatus of claim 23, wherein a selected bank of the plurality of independently accessible memory banks is closer to a processor coupled to the cache controller circuitry than another selected bank of the plurality of independently accessible memory banks.

25. The apparatus of claim 24, wherein the selected bank and the other selected bank are both located within a selected one of the at least two spread bank sets.

26. The apparatus of claim 23, wherein each bank in one of the at least two spread bank sets holds more than one associative way of the one of the at least two spread bank sets.

27. The apparatus of claim 26, wherein the one of the at least two spread bank sets includes at least two memory banks and wherein the at least one associative way of one of the at least two memory banks has a different access latency than another associative way of another one of the at least two memory banks.

28. The apparatus of claim 23, wherein the plurality of independently accessible memory banks are organized into the at least two spread bank sets by mapping a subset of the plurality of independently accessible banks to each one of the at least two spread bank sets.

29. The apparatus of claim 28, wherein the plurality of independently accessible memory banks are organized into the at least two spread bank sets by mapping a first group of banks of the plurality of independently accessible memory banks to one of the at least two spread bank sets and a second group of banks of the plurality of independently accessible memory banks to an other one of the at least two spread bank sets.

30. The apparatus of claim 29, wherein the first group of banks of the plurality of independently accessible memory banks comprises a first column, and wherein the second group of banks of the plurality of independently accessible memory banks comprises a second column.

31. The apparatus of claim 29, wherein the plurality of independently accessible memory banks are organized into the at least two spread bank sets by fair mapping selected ones of the plurality of independently accessible memory banks.

32. The apparatus of claim 29, wherein the plurality of independently accessible memory banks are organized into the at least two spread bank sets by fast shared mapping selected ones of the plurality of independently accessible memory banks.

33. The apparatus of claim 1, wherein the plurality of independently accessible memory banks is organized into an n-way set-associative cache memory including m-spread bank sets, wherein each spread bank set includes a subset of memory banks selected from the plurality of independently accessible memory banks, and wherein at least two of the n-ways has a different access latency.

34. The apparatus of claim 33, wherein each way of the n-ways has a different access latency.

35. A processor, comprising:
an arithmetic functional unit;
cache control circuitry coupled to the arithmetic logic unit; and
a plurality of independently accessible memory banks coupled to the cache control circuitry, wherein at least two of the plurality of independently accessible memory banks have non-uniform latencies, and wherein the plurality of independently accessible memory banks are organized into at least two spread bank sets.

36. A system, comprising:
a processor including cache control circuitry and a plurality of independently accessible memory banks coupled to the cache control circuitry, wherein at least two of the plurality of independently accessible memory banks have non-uniform latencies, and wherein the plurality of independently accessible memory banks are organized into at least two spread bank sets;
a bus operatively coupled to the processor; and
a random access memory operatively coupled to the bus.

37. A method, comprising:
accessing a first datum and a second datum in a plurality of independently accessible memory banks operatively coupled to a processor, wherein at least two of the plurality of independently accessible memory banks have non-uniform latencies, wherein the plurality of independently accessible memory banks are organized into at least two spread bank sets, and wherein a selected one of the plurality of independently accessible memory banks is closer to the processor than a selected other one of the plurality of independently accessible memory banks; and
migrating the first datum to the selected one of the plurality of independently accessible memory banks from the selected other one of the plurality of independently accessible memory banks upon determining that a selected criterion has been met.

38. The method of claim 37, wherein the selected criterion is met upon determining that the first datum is accessed more frequently than the second datum.

39. The method of claim 38, comprising:
migrating the second datum to the selected other one of the plurality of independently accessible memory banks from the selected one of the plurality of independently accessible memory banks upon determining that the selected criterion has been met.

40. The method of claim 37, wherein the plurality of independently accessible memory banks is organized into an n-way set-associative cache memory including m-spread bank sets, and wherein each spread bank set includes at least two memory banks selected from the plurality of independently accessible memory banks.

41. A method, comprising:
accessing a first datum and a second datum in a plurality of independently accessible memory banks operatively coupled to a processor, wherein at least two of the plurality of independently accessible memory banks have non-uniform latencies, wherein the plurality of independently accessible memory banks are organized into a plurality of spread bank sets, and wherein selected ones of the plurality of independently accessible memory banks are closer to the processor than selected other ones of the plurality of independently accessible memory banks; and migrating the first datum progressively closer to the processor through preselected ones of the plurality of independently accessible memory banks from at least one of the selected other ones of the plurality of independently accessible memory banks to at least one of the selected ones of the plurality of independently accessible memory banks upon determining that the first datum is accessed more frequently than the second datum.

42. The method of claim 41, wherein accessing a first datum and a second datum in a plurality of independently accessible memory banks operatively coupled to a processor includes:

searching the plurality of independently accessible memory banks operatively coupled to a processor using a multicast search policy.

43. The method of claim 41, wherein accessing a first datum and a second datum in a plurality of independently accessible memory banks operatively coupled to a processor includes:

searching the plurality of independently accessible memory banks operatively coupled to a processor using a limited multicast search policy.

44. The method of claim 41, wherein accessing a first datum and a second datum in a plurality of independently accessible memory banks operatively coupled to a processor includes:

searching the plurality of independently accessible memory banks operatively coupled to a processor using an incremental search policy.

45. The method of claim 41, wherein accessing a first datum and a second datum in a plurality of independently accessible memory banks operatively coupled to a processor includes:

searching the plurality of independently accessible memory banks operatively coupled to a processor using a partitioned multicast search policy.

46. The method of claim 41, wherein accessing a first datum and a second datum in a plurality of independently accessible memory banks operatively coupled to a processor includes:

searching the plurality of independently accessible memory banks operatively coupled to a processor using a combination of policies selected from a group including: a multicast policy, a limited multicast policy, an incremental search policy, and a partitioned multicast search policy.

47. The method of claim 41, wherein migrating the first datum progressively closer to the processor through preselected ones of the plurality of independently accessible memory banks includes:

evicting a cache line within a selected one of the plurality of spread bank sets based on a least-recently-used (LRU) bit policy.

48. The method of claim 41, wherein migrating the first datum progressively closer to the processor through preselected ones of the plurality of independently accessible memory banks includes:

moving a cache line within a selected one of the plurality of spread bank sets based on a generational promotion policy.

49. The method of claim 48, wherein moving a cache line within a selected one of the plurality of spread balk sets based on a generational promotion policy includes:

selecting a promotion distance for the generational promotion policy; and selecting a promotion trigger for the generational promotion policy.

50. The method of claim 41, wherein migrating the first datum progressively closer to the processor through preselected ones of the plurality of independently accessible memory banks includes:

swapping the first datum with another datum located in a closer memory bank.

51. The method of claim 41, wherein migrating the first datum progressively closer to the processor through preselected ones of the plurality of independently accessible memory banks includes:

choosing a victim bank by accessing a central tag store.

52. The method of claim 41, wherein migrating the first datum progressively closer to the processor through preselected ones of the plurality of independently accessible memory banks includes:

accessing distributed tags included in the plurality of independently accessible memory banks.

53. The method of claim 41, wherein migrating the first datum progressively closer to the processor through preselected ones of the plurality of independently accessible memory banks includes:

accessing partial tags in a central tag store; and accessing distributed tags included in the plurality of independently accessible memory banks.

* * * * *

UNITED STATES PATENT AND TRADEMARK OFFICE
CERTIFICATE OF CORRECTION

PATENT NO. : 6,965,969 B2
APPLICATION NO. : 10/962295
DATED : November 15, 2005
INVENTOR(S) : Douglas C. Burger et al.

It is certified that error appears in the above-identified patent and that said Letters Patent is hereby corrected as shown below:

Insert the following at Column 1, line 12, after the paragraph entitled: "CROSS-REFERENCE TO RELATED APPLICATION" and before the paragraph entitled "TECHNICAL FIELD":

--STATEMENT REGARDING GOVERNMENT SPONSORED RESEARCH OR DEVELOPMENT

This invention was made with government support under 9984336 and 9985109 awarded by The National Science Foundation. The government has certain rights in the invention.--

Signed and Sealed this

Twenty-eighth Day of July, 2009

JOHN DOLL
*Acting Director of the United States Patent and Trademark Office*

UNITED STATES PATENT AND TRADEMARK OFFICE
CERTIFICATE OF CORRECTION

PATENT NO. : 6,965,969 B2 Page 1 of 1
APPLICATION NO. : 10/962295
DATED : November 15, 2005
INVENTOR(S) : Douglas C. Burger et al.

It is certified that error appears in the above-identified patent and that said Letters Patent is hereby corrected as shown below:

Insert the following at Column 1, line 12, after the paragraph entitled: "CROSS-REFERENCE TO RELATED APPLICATION" and before the paragraph entitled "TECHNICAL FIELD":

--STATEMENT REGARDING GOVERNMENT SPONSORED RESEARCH OR DEVELOPMENT

This invention was made with government support under 9984336 and 9985109 awarded by The National Science Foundation; and F33615-01-C-1982 awarded by the Department of Defense/DARPA. The government has certain rights in the invention.--

This certificate supersedes the Certificate of Correction issued July 28, 2009.

Signed and Sealed this

Twenty-fourth Day of November, 2009

David J. Kappos
*Director of the United States Patent and Trademark Office*